United States Patent [19]

Kummermehr et al.

[11] 4,447,345
[45] May 8, 1984

[54] THERMAL INSULATING FLEXIBLE CERAMIC CONTAINING FLAME HYDROLYSIS PRODUCED MICROPOROUS OXIDE AEROGEL

[75] Inventors: Hans Kummermehr, Ludwigshafen; Rolf Sommer, Dannstadt-Schauernheim, both of Fed. Rep. of Germany

[73] Assignee: Grünzweig & Hartmann und Glasfaser AG, Ludwigshafen, Fed. Rep. of Germany

[21] Appl. No.: 356,504

[22] Filed: Mar. 9, 1982

[30] Foreign Application Priority Data

Mar. 9, 1981 [DE] Fed. Rep. of Germany ....... 3108816

[51] Int. Cl.$^3$ .................... C04B 43/02; E04B 1/78
[52] U.S. Cl. ..................... 252/62; 423/336; 428/76; 428/297; 428/331; 428/372; 428/446; 428/688; 428/697; 428/920; 501/95; 501/133
[58] Field of Search .................. 252/62; 423/336; 428/76, 297, 331, 372, 446, 688, 697, 920; 501/95, 133

[56] References Cited

U.S. PATENT DOCUMENTS

| | | | |
|---|---|---|---|
| 3,055,831 | 9/1962 | Barnett et al. | |
| 3,296,060 | 1/1967 | Seitzinger | 501/95 |
| 3,869,334 | 3/1975 | Hughes et al. | 428/331 |
| 3,962,014 | 6/1976 | Hughes et al. | 428/76 |
| 4,013,476 | 3/1977 | Ueda et al. | 501/95 |
| 4,174,331 | 11/1979 | Myles | 501/95 |
| 4,208,214 | 6/1980 | Stein et al. | 501/95 |
| 4,221,672 | 9/1980 | McWilliams | 252/62 |
| 4,298,387 | 11/1981 | Kratel et al. | 501/133 |
| 4,327,280 | 4/1982 | McWilliams | 219/354 |
| 4,359,496 | 11/1982 | Kratel et al. | 428/76 |

FOREIGN PATENT DOCUMENTS

1954992 5/1971 Fed. Rep. of Germany .
1205572 9/1970 United Kingdom ................. 252/62

*Primary Examiner*—John E. Kittle
*Assistant Examiner*—Robert A. Wax
*Attorney, Agent, or Firm*—Cushman, Darby & Cushman

[57] ABSTRACT

A thermal insulating flexible ceramic based on a microporous oxide aerogel obtained from flame hydrolysis, especially a silica aerogel with elastically bending or limply bending inorganic fibers and possibly additional additive substances, such as opacifiers, has a portion by weight between about 10 and 30% of the flexible ceramic in the form of fibers with a length of more than 10 mm with a comparatively high bulk density of about 200 to 250 kg/m$^3$, especially of about 350 kg/m$^3$. Although no binder such as e.g. phenol resin is contained therein, said flexible ceramic in the case of a given high content of long fibers, has a high bending strength, but at the same time it is very resistant to breakage in the case even of multiple bendings around relatively small bending radii. For such a flexible ceramic, one may produce pliable thermal insulating foils (5) with low thicknesses (d) of, if necessary less than 1 mm, which still have considerable stability of shape, but which may be bent very well and may even be stamped. Furthermore, the flexible ceramic may be used for the formation of covered up insulating layers or of insulating layers laminated on both sides in thermal insulating elements possibly also of a more complicated molding. In order to be able to admix the high portion of long fibers without the formation of local fiber agglomerations, said fibers are admixed separated, e.g. by flakes, as a last component to the already finished premixture of the raw material.

75 Claims, 8 Drawing Figures

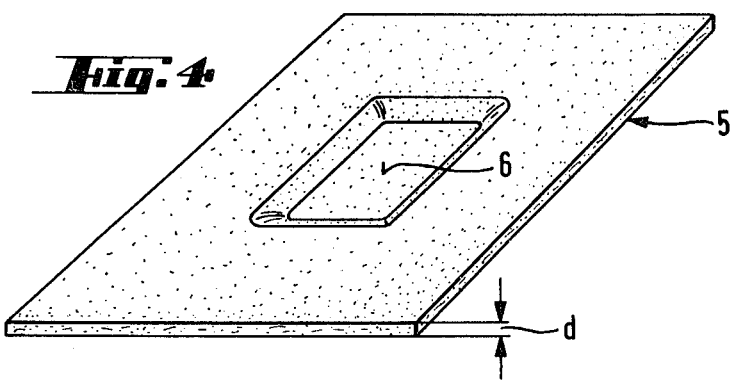
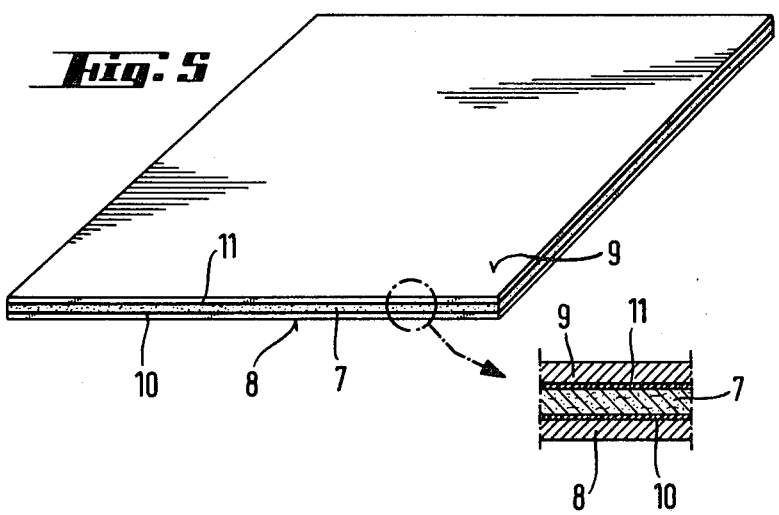
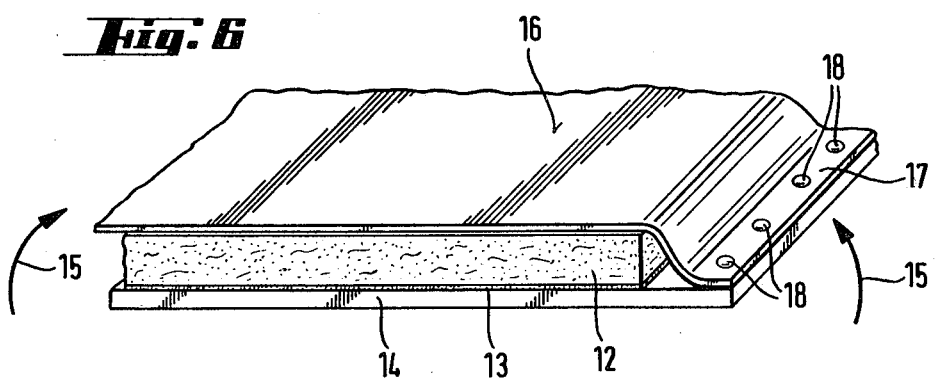

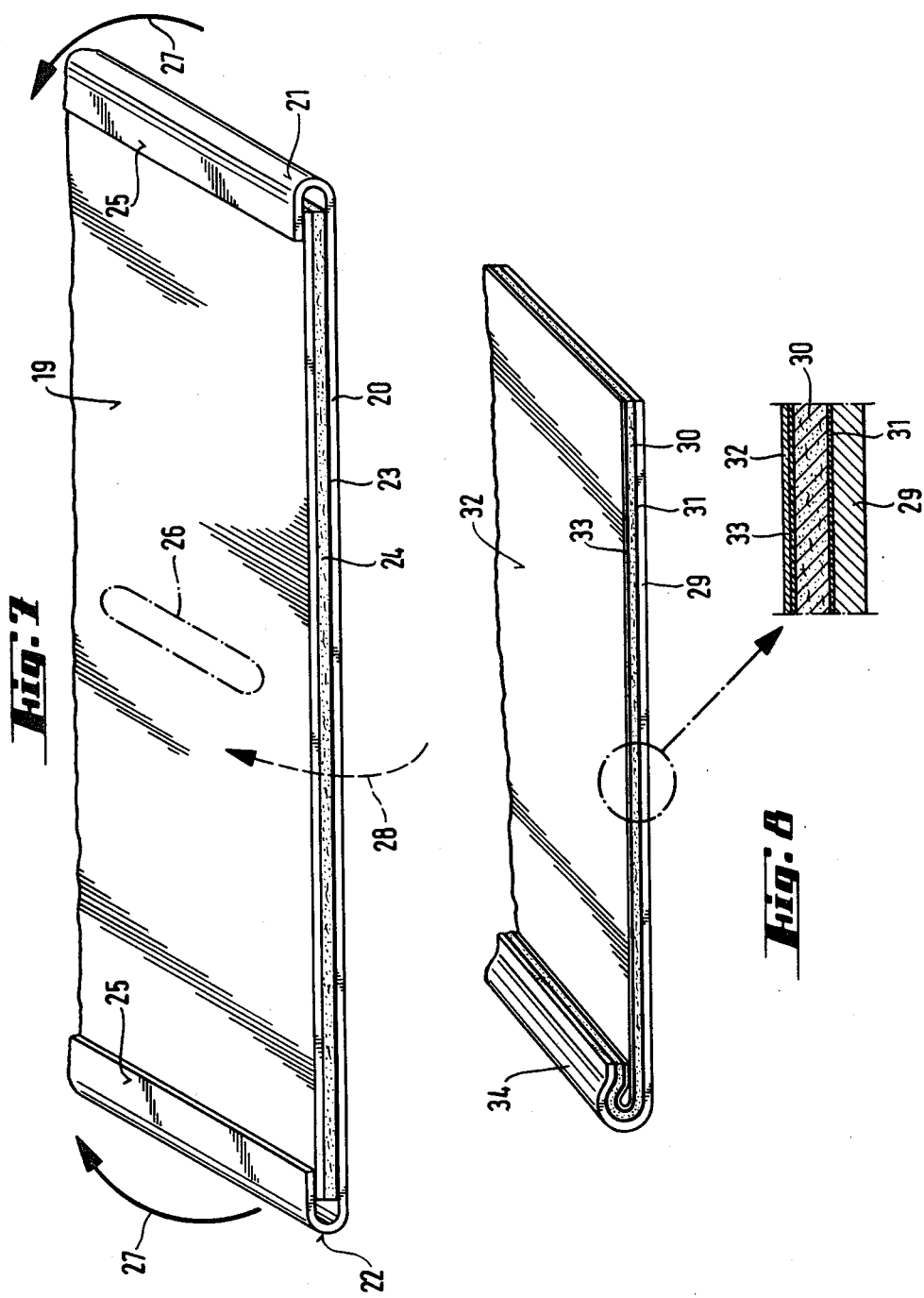

THERMAL INSULATING FLEXIBLE CERAMIC CONTAINING FLAME HYDROLYSIS PRODUCED MICROPOROUS OXIDE AEROGEL

BACKGROUND OF THE INVENTION

The invention relates to a thermal insulating flexible ceramic based on a microporous oxide aerogel obtained from flame hydrolysis, with elastically bendable or limply bendable inorganic fibers and possibly additional additive substances, such as especially opacifiers, as well as a process for its production, a foil made from it and a laminated thermal insulating element produced therewith.

Thermal insulating flexible ceramics based a microporous oxide aerogel obtained from flame hydrolysis, especially silica aerogel, have been known widely and are on the market for example under the tradename MINILEIT (registered trademark) of the assignee and have been described often.

As the German Pat. No. 19 54 992 explains in detail in this connection, the essential problem consists in the fact that plastics made from such finely dispersed substances have to be sure excellent thermal insulation characteristics but are hardly capable of a mechanical stress. Whenever such a substance is pressed into a plate, as is known for example from the German OS No. 30 04 187, for the formation of the support plate for an electric heating coil of a radiation heat cooking plate, then even in the case of slight mechanical stresses, the microporous material crumbles on the surface and the plate will be so brittle that it will break almost without previous deformation in the case of the slightest stress from bending. Therefore, the mechanical characteristics of such plates resemble those of, for example, bound fine sand, etc. Such plates would be suitable therefore only for cases of application in the case of which the material is practically not exposed to any kind of mechanical stresses, thus, lies say only in the receiving shell for the heating coil of a cooking plate and mounts the former.

According to the doctrine of the cited German Pat. No. 19 54 992, such a flexible ceramic is to obtain a better mechanical load carrying ability through the fact that it be surrounded by a flexible casing which fits against the flexible ceramic under pressure. According to the further doctrine of e.g. the German Pat. No. 20 36 124, the pressing of the microporous substances in the casing is to be carried out in such a way that an as close as possible meshing of the finely dispersed substances among themselves and with the surface or the pores of the relatively rough encasing, for example, made of glass fiber, will take place. Just as in the case of the German Pat. No. 19 54 992, an increased rigidity is to be imparted with this process to said sandwich plate, but an airtight sealing and evacuation as well as a use of resin-like binders which decrease the capacity for thermal insulation, is to be avoided. The rigidity thus increased of the encased plate to be sure raises the capacity for withstanding bending stresses of the plate to a certain even though relatively slight degree, but the material within the encasing will break practically without any previous deformation as soon as a stress occurs exceeding the flexural strength.

From the German OS No. 29 28 695 therefore, a thermal insulation plate basically corresponding in its structure to the plate of the German Pat. No. 20 36 124 has been known, in the case of which there is avoided by a separating agent between the surface of the finely porous damping material and the encasing, that the pressing process in this case leads to a mechanical clawing together. As a result of that, relative movements between the surface of the microporous flexible ceramic and the encasing become possible and it results, which per se is surprising, in a considerably improved bendability of the compound body, but only as long as the microporous flexible ceramic originating from the pressing process, is held in a state of pressure on all sides in the encasing through the tensile stresses.

Thus, with such encasings, it is true that the mechanical properties of thermal insulating plates etc. on the basis of such microporous flexible ceramics may be improved to a certain extent, however, quite apart from the necessary expenditures for the encasing this improvement is only sufficient for a relatively small number of cases of application for such a highly effective thermal insulating flexible ceramic and very many other cases of application are eliminated by the necessary encasing made of a fiber glass fabric, etc., i.e., in the cases in which such an encasing disturbs or cannot be used at all.

In regard to the material composition of such a flexible ceramic in detail as well as with regard to its physical properties, the status of the prior art offers a very large number of proposals. According to the German AS No. 16 71 186, for example, the flexible ceramic is to consist of 70% by weight of a silica-aerogel, 20% by weight of channel black as an opacifier and 10% by weight of aluminum silicate fibers, and it is to be condensed to a density or a weight per unit of volume of 240 kg/m$^3$, so that at a temperature of 200° C., it will result in a heat conductive capacity of the flexible ceramic of 0.022 W/mK. According to the doctrine of the German AS No. 16 71 186, the bulk density may be increased if necessary also up to 400 kg/m$^3$, but we should like to point out that too high a pressing with a compression of the microstructure of the material is to be avoided, since any further compression of such a structure would increase the heat conductive capacity of the material, and insofar as it attempts to destroy the microporous structure also would increase the conductive factor of the fiber material by increasing the overall contact surface between the participating particles and the insulation. The aluminum silicate fibers which may be wholly or partly replaced by carbon fibers increase to be sure the conductivity of the substance but they form a net of fibers which binds the aerogel and opacifier particles loosely.

According to the German OS No. 28 06 367, the material is to contain aluminium oxide fibers in a quantity of up to 12% by weight. In the case of the upper limit of the portion of fibers of 20% stated there in one place, we are dealing with an obvious typing error, particularly since it has also been expressly explained that approximately 12 and preferably 10% by weight of aluminum oxide fibers constitute a practical upper limit, while a preferred portion of aluminum oxide fibers that are to be added lies in the area between 1 and 7% by weight of the entire material. The upper limit of the portion of aluminum oxide fibers of 10 to 12% does not only result in consequence of the heat conductive capacity rising with a higher fiber portion, but also is a result of problems of mechanical strength of the material, which however, is to be used again anyway for the mounting of the electric heating coil of a hot plate and for similar cases of application in case of which mechanical stresses hardly occur. The bulk density of the flexible ceramic according to the doctrine of the German OS No. 28 06 367 may lie between 160 and 480 kg/m$^3$, but in the case of the therein stated data of 0.16 to 0.48 kg/m$^3$, we are dealing again with an obvious clerical error as far as the decimal point is concerned.

From the European patent application OS No. 13 387 such a flexible ceramic has been known furthermore which may contain 30 to 95% by weight of aerogel and 5 to 70% by weight of opacifier, possibly with the addition of up to 5% by weight of organic or inorganic binder, whereby the opacifier is admixed to the agglomerating aerogel for coagglomeration in immediate succession to the flame hydrolysis in order to avoid the expenditure of a mechanical mixing of these substances and in order to achieve improved mechanical characteristics. At the same time and if necessary, the opacifier may show anisotropic geometrical shapes, such as for example fiber or flake structure. This mixture is compressed with a pressure of for example 15 bar which could lead to a bulk density in the order of magnitude of about 250 kg/m$^3$. Beside the coefficient of thermal conductivity, the indentation hardness was measured in samples produced thus, whereas the same values were determined in comparative examples which were materially the same and in the case of which a mechanical mixing of the aerogel with the opacifier was accomplished. While no determinations were made concerning bending strength of the samples, the examples and comparative examples show that the indentation hardness in the case of the coagglomeration would lie higher only whenever ilmenite was used as an opacifier so that in this respect too, an increase of the mechanical strength may possibly be achieved in exceptional cases or in a very limited way. By coagglomeration alone instead of mechanical mixing, an increase of the bending strength or bendability of the flexible ceramic is not to be expected either.

From the U.S. Pat. No. 3,055,831 finally, a great multiplicity of examples for material mixtures and mechanical treatments of such flexible ceramic has been known, whereby the bulk densities vary between about 95 and 800 kg/m$^3$ and between 2 and 75% of reinforcing fibers added. At the same time, however, an organic (or also inorganic) binder such as phenolformaldehyderesin was added in a quantity which results in a desired strength; as a result of that, it is true, one may achieve any desired strength in case of correspondingly high binder content and good binding action, especially of organic binders, but naturally at the expense of the thermal insulating characteristics and frequently with energy consuming curing. In the case of very high fiber contents of 38 and 67%, a moldable mat developed with low bulk density below 200 kg/m$^3$ which to be sure is easily bendable, but has in practice no bending strength and tensile strength, as has been known per se in the case of fiber mats. In the case of a fiber content of 15% and a synthetic resin binder in a portion of 10%, in each case related to the weight, there resulted when using 75% of channel black however without any aerogel, a manageable body with a volumetric density of about 250 kg/m$^3$ about the strength characteristics of which however there are no detailed data. In the case of a fiber content of 12% and a plastic on the basis of silica aerogel, there resulted in the case of a synthetic resin binder content of 5%, a bulk density of about 320 kg/m$^3$ with a bending strength of about 52 N/cm$^2$, in the case of 67% silica aerogel and 16% silicon as additional components or of about 32 N/cm$^2$ in the case of 55% silica aerogel and 28% titanium dioxide as additional components. A bending strength of 31 N/cm$^2$ was also achieved with 5% fibers, 81% silica aerogel and 9% black as well as 5% phenol resin binder even in the case of a lower bulk density of about 256 kg/m$^3$.

The examples stated in the U.S. Pat. No. 3,055,831 all have organic binders in the form of phenol formaldehyde resin or insofar as the above described examples are concerned, they have phenol resins which in the case of the hardening heat treatment, is burnt out practically free of residue in an exothermic process and leads to a sinterlike baking of the finely dispersed particles of the flexible ceramic. The proposal has also been made already to use boron carbide as an inorganic binder which at about 800° C. in an exothermic reaction passes over into boron oxide which bakes the finely dispersed particles together like a cement matrix. The result of such organically or inorganically "hardened" flexible ceramics of this type is in any case a very considerable increase of the bending strength as compared to the same flexible ceramic without binder and generally of the mechanical strength, but the flexible ceramic just as before, is very brittle; it will not yield either noticeably even under higher bending stresses below the bending strength, and after exceeding the bending strength, it will break as a result of the bending stresses suddenly almost without previous deformation.

Beside the very considerable expenditure in production technology as a result of the heat treatment required as a rule over an extended period of time, the customary binder admixtures in the case of flexible ceramics of the present variety have the disadvantage of a relatively inhomogeneous, locally variable hardening. The particles of the binder are ground in special mills, for example, vibrating or ball mills, to a small grain size which should correspond at least approximately to the grain size in the raw material mixture of the flexible ceramic, and are worked mechanically into the raw material mixture with the help of a mixing apparatus. This mixing however is imbued with considerable difficulties, since both the fine grained binder particles as well as the aerogel and opacifier particles immediately form secondary agglomerates during the mixing, so that an effective intermixing of binders and raw materials of the residual mixture will be prevented. Therefore, after hardening, only certain particle compositions will be held together by the binder-agglomerate and the product in the case of stress is inclined to premature breaks in areas which have little binder.

This disadvantage to be sure will be avoided by the doctrine of the German patent application No. 29 42 087.9 of the applicant, according to which the binder, which is distributed evenly with a dispersing agent in a premixture, is present in a finely dispersed manner, so that the aerogel and opacifier particles are cross-linked homogeneously in the compound with their edges and corners. Here, too, however a body develops with to be sure high bending strength, but with extremely low bendability or deflection in the case of bending stress.

The share of fibers and the bulk density play no essential role in the case of such flexible ceramics hardened with binder, since the desired improvement of the mechanical strength, especially of the bending strength, is derived in consequence of the portion of binder from the aerogel and opacifier particles baked together with one another, which form a strong and rigid compound which primarily is held by the sintering together of the particles and not by the occluded fibers. This becomes clear also through the fact that in the case of the above cited examples of the U.S. Pat. No. 3,055,831, no loss in bending strength was found despite a decrease of the portion of fibers from about 12 to 5% and despite a simultaneous decrease of the bulk density from about 320 to 256 kg/m$^3$. This finding is obviously because the portion of finely dispersed opacifiers and especially of aerogel particles was increased by the decreased portion of fibers resulting in increased sintering and baking together forces, which balance out any possible loss of strength by a decrease of the bulk density.

According to the doctrine of the U.S. Pat. No. 3,055,831, deformable fiber mats should have a fiber portion of at least 35% by weight up to 75% by weight, whereby in the case of a fiber content of 50% by weight, coefficient of thermal conductivity of about 0.036 W/mK is cited. For strong and rigid bodies on the other hand, the fiber content should lie preferably at about 5% by weight but it may rise up to 12 to 15% by weight without however—as explained previously—bringing noticeable strength improvement of the hardened plate in the case of a fiber portion increased to 12 to 15% by weight.

According to the doctrine of the U.S. Pat. No. 3,055,831, asbestos fibers are to be used also at a length which is to lie at least 25% above approximately 6 mm. Such fibers with a mean length between for example 5 and 10 mm may be mixed in any case up to a weight portion of 10 or 12, in the extreme case also 15%, with the aerogel and the opacifier still without causing problems, i.e., without forming fiber agglomerates. The thickness of the fibers according to the U.S. Pat. No. 3,055,831 lies below 20 μm, preferably at 10 μm. Since the diameters of the aerogel particles lie in the order of magnitude of $10^{-10}$ m, even short, thin fibers will still form macroscopic bodies in the microstructure of the aerogel particles. Even in the case of a fiber thickness of a few μm, this is still greater by the factor of 10,000 than the diameter of the aerogel particles.

In summary therefore, the following proposals have been known from the state for the prior art, of improving the mechanical characteristics of flexible ceramics of this kind:

1. The flexible ceramic is pressed in an encasing made of air permeable glass fiber fabric or something similar (German Pat. No. 19 54 992). At the same time, either a clawing together or a clamping together of the flexible ceramic surface with the encasing fabric is achieved (German Pat. No. 20 36 124), in order to improve the reciprocal action and in order to obtain an increased rigidity and bending strength, or a separating agent is inserted between the surface of the flexible ceramic and the encasing (German OS No. 29 28 695), in order to make possible relative movements and in order to make the compound body bendable to a certain extent. Such encasings however are expensive and they restrict the usability of such a thermal insulating material.
2. The mechanical characteristics are to be improved by coagglomeration of the opacifier with aerogel following immediately after the flame hydrolysis (European OS No. 13 387). Even in so far as these mechanical characteristics relate to the hardness of the surface, an improvement may only be achieved in the case of certain opacifiers. An increase in the bending strength or in the bendability of the flexible ceramic by this method has not been stated and is not to be expected either.
3. By the addition of binders, a hardening effect may be achieved (U.S. Pat. No. 3,055,831 or German patent application P No. 29 42 087.9). In the case of a fiber portion of preferably 5 to 10%, a rigid plate of considerable bending strength will result which however is very brittle and may practically not be bent at all. The portion of the fibers, the length of which at 25% or more lies above approximately 6 mm, may be increased to 12 up to a maximum of 15%, however, this is without any measurable influence on the bending strength. A better bendability will likewise not result, since the binder improves the bending strength of the flexible ceramic at any rate.

As a result of a higher increased fiber portion of 35 to 75% by weight, preferably 50% by weight, there results when using about 5% by weight of phenol formaldehyde resin as a binder, a fibrous feltlike body with a low bulk density of below 200 kg/m$^3$ with a coefficient of thermal conductivity which still lies just barely below that of still air. Such fiber mats are bendable but they have very low strength, especially very low bending strength (Examples IV and V of the U.S. Pat. No. 3,055,831).

SUMMARY OF THE INVENTION

The invention is based on the task of creating a flexible ceramic which while having the highest possible bending strength, is still readily bendable, therefore to be sure on the one hand it has a sufficient molding stability for the formation possibly also of thin plates, on the other hand however, say for the purpose of adapting it to curvatures without breaking off, may be deformed to a high degree.

The general area of the portion of weight of the fibers lies between about 10 and 30% of the flexible ceramic, far above the maximal fiber admixture according to the state of the prior art for the formation of plates with molding stability with 12 to 15% by weight of fibers and below the fiber portion of 35% by weight for the formation of bendable fiber mats according to the doctrine of the U.S. Pat. No. 3,055,831. Insofar as we are dealing with aluminum silicate fibers, the fiber material of which has a specific density of about 2.55 g/cm$^3$, the portions of weight according to the invention are valid directly. In the case of specifically heavier or lighter fibers, one must adapt by the factor which corresponds to the ratio of the deviating density in g/cm$^3$ of 2.55. Therefore, double the quantity in weight must be added of specifically twice as heavy fiber material, so that the decisive volume replaced by the fibers will remain the same. However, one cannot refer to the portion of volume of the fiber in the flexible ceramic, since the volume of the flexible ceramic mixes considerably depending on the bulk density selected, the portion of the fiber however must be changed according to the present invention surprisingly not precisely in dependence on the variation of this bulk density. Rather, a given optimal quantity of fibers in a flexible ceramic with a bulk density of 200 kg/m$^3$ acts just as optimally in a flexible ceramic with the bulk density of 400 kg/m$^3$, although there, the relative portion of volume of the almost incompressible fibers is approximately twice as high. On the other hand, it is not a matter of the mere portion of weight either independently of the specific density, but of the volume admixed in the individual case, the latter however again independent of the volume or the bulk density of the flexible ceramic.

According to the realizations on which the invention is based, however, it is not a question of the portions by weight of all fibers of an admixed fiber mixture—in the case of a specific density of the fiber material of 2.55 g/cm³—lying in the general area between 10 and 30% by weight of the flexible ceramic, since it turned out that fibers of a length of below about 10 mm are practically without any influence on the mechanical characteristics especially as far as the bendability is concerned. Therefore, it has been prescribed according to the invention that the general area of a portion by weight of the fibers of between 10 and 30% of the flexible ceramic is to be valid further only for such fibers which have a greater length than about 10 mm. At the same time, it is true, one should use fiber mixtures, in which the fibers with lengths above 10 mm is a maximum so that the portion of fibers which, as compared to the limit of 10 mm, are shorter, as well as of the unavoidable impurities, will be relatively low in each case and completely disappear in the ideal case. This is true because fibers with a lesser length than about 10 mm hardly contribute to influencing the mechanical characteristics and especially result in no improvement of the bendability, but increase the coefficient of thermal conductivity which in every case is a disadvantage. In practice it turned out however that in any case, whenever mineral fibers, for example aluminum silicate fibers are used, a portion of shorter fibers and impurities of about 10% of the fiber mixture can no longer be avoided with a justifiable expense, so that even in the case of the use of special long staple fibers, the total share of fibers in practice lies minimally at about 11 to 12 and maximally at about 33 to 34% by weight in order to reach a fiber portion with a greater length than 10 mm between about 10 and 30% by weight of the flexible ceramic. Without the use of special fibers, such as long staple fibers, or something similar, a total admixture of between 12 and 15% by weight of fibers will result for achieving a minimal portion of 10% by weight of long fibers, so that the practical upper limit of the portion of fibers of 12 to 15% by weight represents according to the state of the prior art approximately the lower limit of the corresponding area according to the invention.

As shall be explained in more detail further below, at least one of the effective mechanisms of the high fiber portion of great length according to the invention, consists in the fact that the individual fibers are kept at a sufficient number as a result of the aerogel particles. Since additive substances with the exception of binder for hardening may exert no comparable holding action on the fibers for hardening, the aerogel portion of the flexible ceramic therefore should not drop below 40% by weight so that the sum of the portions by weight of fibers and additive substances altogether may vary between about 10 and 60% by weight, the aerogel portion correspondingly varying therefore between 40 and 90% by weight. This means that in higher ranges of the portion of fibers, the portion of opacifier must possibly be reduced in order not to exceed the sum of maximally 60% by weight for this purpose. A binder for hardening corresponding to the doctrine of the U.S. Pat. No. 3,055,831 must however not be contained under any circumstances in the flexible ceramic, since this would lead in the area of the portion of fiber according to the invention to a baking together or a becoming brittle of the flexible ceramic and therefore destroy again the bendability primarily sought according to the invention.

The bulk density of the flexible ceramic is critical only insofar as it is supposed to be in every case above 200 kg/cm³, in order to result in a sufficient mechanical strength, a preferred area being above 250 kg/cm³. Higher bulk densities between 300 and 400 kg/m³ are especially preferred, the thermal insulating capacity of flexible ceramic beginning to decrease above 300 kg/m³. A particularly favored bulk density lies in the area of 350 kg/m³ because there, only a very small drop in capacity for thermal insulating can be found as a result of the increased bulk density and on the other hand however very good strength data will be achieved.

Below a portion of weight in fibers which are even longer than 10 mm, of 10% of the flexible ceramic, even very long fibers result in no noticeable improvement of the bending strength and of the bendability, wherefore in this case, the lower limit of the general area for the portion of fibers lies here. The greatest increase in bending strength and surprisingly at the same time of the bendability is found where the portion of long fibers lies between 14 and 20% by weight of the flexible ceramic, whereas the upper limit of the general area for the fiber portion of about 30% by weight of the flexible ceramic results from the fact that from thereon both the bending strength as well as surprisingly also the bendability, in any case insofar as no hardening binder according to the invention has been added, again drop to unusable values.

Preferably one operates with fiber mixtures, the fiber length of which has a maximum which is clearly higher than 10 mm, for example, it lies at 30 to 50 mm. As a result of this, the portion of fibers with lesser length as compared to 10 mm, is kept low even without any special measures in addition. On the other hand, an upper limit for this maximum of distribution results at 50 to 70 mm, since too high a portion of longer fibers may have just as disadvantageous an effect as too high a portion of short fibers and impurities; for a fiber with, for example, 100 mm length hardly turns out to be more effective for influencing the mechanical characteristics, than a fiber of, for example 30 to 50 mm length; however as a result of a high portion of particularly long fibers at an equal portion of weight, the number of fibers will decrease, and this becomes unfavorably noticeable for the strength values and also for the bendability. As a result of the same realization, it also follows that the fiber diameter should lie in any case on average below 10 $\mu$m preferably below 5 $\mu$m and especially between about 1 and 3 $\mu$m, in order that in the case of a given portion of weight one will not drop below a predetermined number of fibers.

As will be explained in more detail still further below, it will be possible to produce a flexible ceramic on the basis of the invention, the bending strength of which reaches approximately into the order of magnitude of the bending strength of hardened flexible ceramics according to the U.S. Pat. No. 3,055,831, which however at the same time is readily bendable around small radii in relation to the thickness of a body itself formed from this flexible ceramic and which at the same time has such great toughness that even repeated bending back and forth would not necessarily lead to a tearing off. This is a similar qualitative difference as between say cast iron and spring steel. At the same time, it is possible to produce even thin foils with thickness of only about 1 mm and even less from a flexible ceramic according to the invention, which foils have approximately the mechanical characteristics of asbestos paper. Especially such foils, but even thicker plates may be laminated with a carrier material such as a metal foil, sheet metal or something similar, or may be covered up on both sides, and attached to such a carrier material they have even further improved characteristics with respect to their bendability so that even the edges of such laminated plates may be bent almost at sharp edge by 180°, e.g. they may be beaded, without destroying the mechanical integrity of the highly effective insulating layer formed from the flexible ceramic according to the invention.

Further details, characteristics and advantages of the invention will result from the subsequent description of examples on the basis of the drawings especially in connection with the appended claims.

BRIEF DESCRIPTION OF THE DRAWINGS

FIG. 4 shows a view of a thin foil produced from the flexible ceramic with an embossing, FIG. 5 shows a view of a thermal insulating element in sandwich construction produced from the flexible ceramic, FIG. 6 shows a partial view of another embodiment of a thermal insulating element in sandwich construction, FIG. 7 is a modified embodiment of a thermal insulating element according to FIG. 6, and FIG. 8 shows a flexible ceramic as a thermal insulating element laminated on both sides and with a beaded edge.

DETAILED DESCRIPTION

Figure 1:
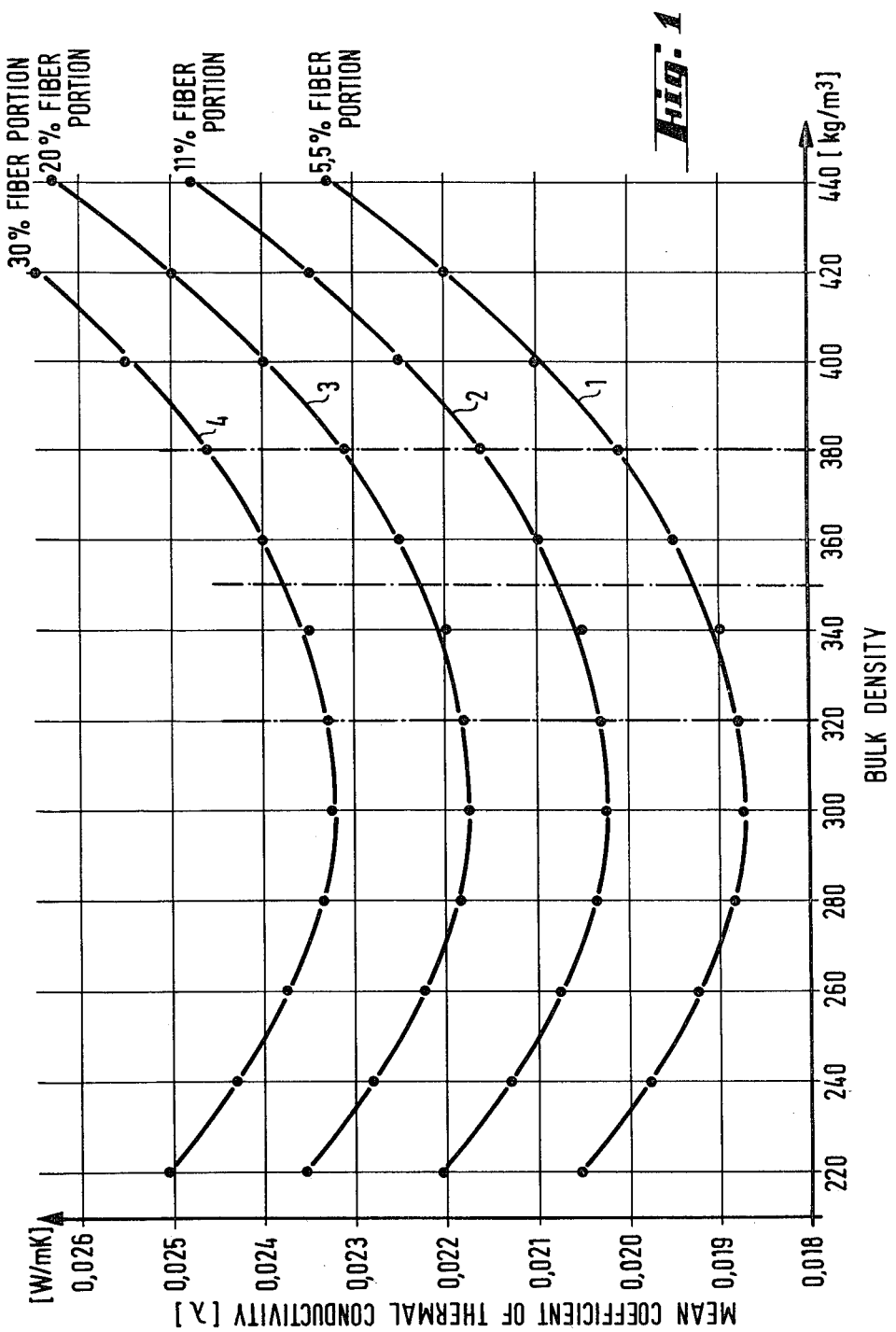
FIG. 1 shows a diagram concerning the dependence of the mean coefficient of thermal conductivity $\lambda$ on the bulk density of the flexible ceramic with different portions of fiber.

In FIG. 1, the behavior of the mean coefficient of thermal conductivity $\lambda$ has been examined in the case of a changing bulk density of a flexible ceramic according to the invention, various fiber portions being investigated. The measurement was accomplished at a medium temperature of 200° C. For the measurements samples from four different recipes were produced in steps of 20 kg/m$^3$ always in the bulk densities between 220 and 440 kg/m$^3$. Aluminum silicate long staple fibers were used as fiber with a frequency maximum of the fiber length at about 40 mm, in which approximately 10% of the entire fiber portion were present as impurities or as short fibers with a length below 10 mm. Fibers with a length of more than 10 mm will be called "long" fibers subsequently as an abbreviated form.

As oxide aerogel, silica aerogel was selected. Silicon carbide served as an opacifier. The recipes of the curves designated with 1, 2, 3 and 4 in FIG. 1 are listed in the subsequent Table.

TABLE 1

| Fiber Portion Total Wt % | Portion Long Fiber Wt % | Portion SiO$_2$ Aerogel Wt % | Portion SiC Opacifier Wt % |
|---|---|---|---|
| 5,5 | 5 | 60,2 | 34,3 |
| 11 | 10 | 60,0 | 29,0 |
| 20 | 18 | 60,0 | 20,0 |
| 30 | 27 | 55,0 | 15,0 |

As FIG. 1 illustrates in this connection, generally a higher coefficient of thermal conductivity will result with a higher fiber portion. Even in the case of a fiber portion of altogether 30% by weight and a bulk density of 300 kg/m$^3$, the coefficient of thermal conductivity however lies only barely above 0.023 W/mK which, compared with the corresponding coefficient of thermal conductivity of still air at 200° C. of about 0.039 W/mK, is still an exceedingly low value which results in a correspondingly high thermal insulating capacity. Above and below a bulk density of 300 kg/m$^3$, the coefficient of thermal conductivity rises slightly, but even at 400 kg/m$^3$ and highest fiber portion of 30% by weight with about 0.0255 W/mK, it still is quite considerably more favorable than the coefficient of thermal conductivity of still air. The rise of the coefficient of thermal conductivity above approximately 300 kg/m$^3$, which at first starts very slowly, originates essentially from the fact that a stronger compression of the material leads to a more intimate mutual contact of the aerogel particles and other components of the flexible ceramic, as a result of which the heat conductivity is increased. The increase up to below 300 kg/m$^3$ is due to the fact that the flexible ceramic is not dense enough in order to prevent the heat conduction sufficiently within the air contained in the flexible ceramic. The basic increase of the coefficient of thermal conductivity with an increased fiber portion is due to the circumstance that the fibers, particularly in case of correspondingly great length of fiber, have an increased heat conductivity as compared to the aerogel basic substance, whereby long fibers are particularly good heat conductors, viewed relatively.

Figure 2:
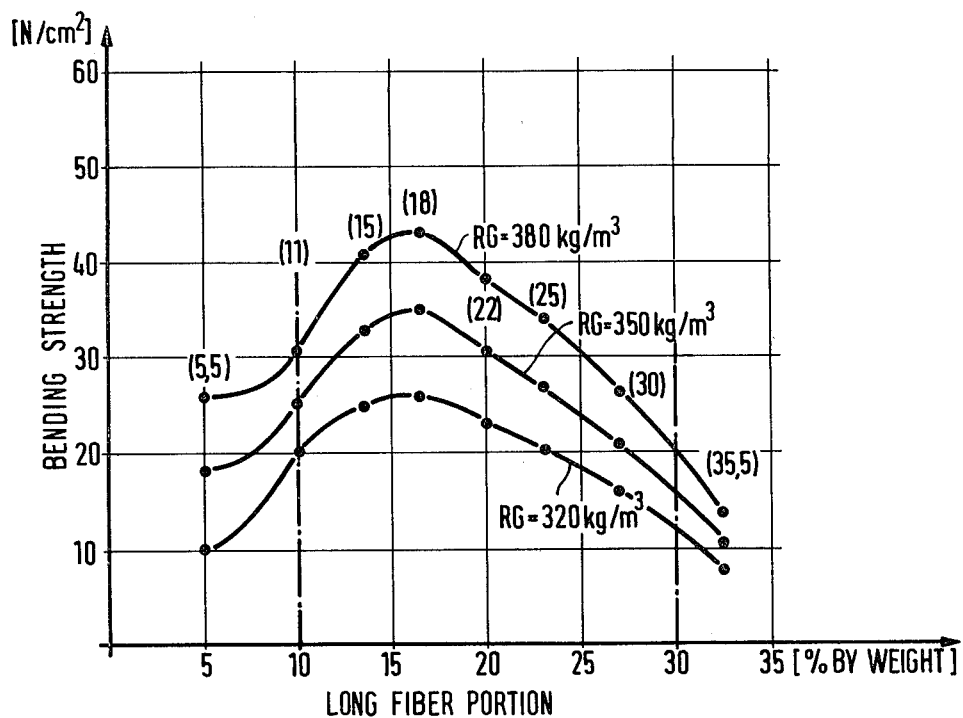
FIG. 2 shows a diagram of the dependence of the bending strength on the portion of long fibers in the case of different bulk densities.

On the other hand, FIG. 2 illustrates that the bending strength as well as the mechanical loading capacity of the flexible ceramic basically increases with an increased bulk density. At the same time, in the area above 300 kg/m$^3$, a relatively great increase is to be found which, for any given flexible ceramic, depends approximately linearly on the increase of the bulk density. Whereas in the case of bulk densities above approximately 400 kg/m$^3$, an additional increase of strength would basically be achievable, the coefficient of thermal conductivity in this case, particularly in case of likewise high portion fibers, thus increases indeed very clearly so that this area should be avoided whenever the pertinent strength requirements will permit this. In the area between 300 and 350 kg/m$^3$ on the other hand, the heat conductivity increases, as illustrated in FIG. 1, only gradually, so that in this case a considerable increase in strength without essential increase of the coefficient of thermal conductivity may be observed. Therefore, a bulk density in the range of about 350 kg/m$^3$ represents an optimal compromise for many cases, in the case of which only a very modest increase of the coefficient of thermal conductivity has to be put up with, as compared to a bulk density of 300 kg/m$^3$, where already a very clear improvement in strength may be achieved.

In order to determine the dependence of the bending strength on the portion of long fibers according to FIG. 2, samples with a length of 160 mm, a width of 40 mm and a thickness of 20 mm at the bulk densities of 320 kg/m$^3$, 350 kg/m$^3$ and 380 kg/m$^3$ were produced with fiber portions changing in accordance with Table 2 and were subjected without lateral restraint to a bending experiment by a shock-free load in the middle between the supports.

TABLE 2

| Fiber Portion Total Wt % | Portion Long Fibers Wt % | Portion SiO$_2$—Aerogel Wt % | Portion SiC—Opacifier Wt % |
| --- | --- | --- | --- |
| 5,5 | 5 | 60,2 | 34,3 |
| 11 | 10 | 60,0 | 29,0 |
| 15 | 13,5 | 60,0 | 25,0 |
| 18 | 16,5 | 62,0 | 20,0 |
| 22 | 20 | 58,0 | 20,0 |
| 25 | 23 | 55,0 | 20,0 |
| 30 | 27 | 55,0 | 15,0 |

Again, aluminum silicate long staple fibers were used as fibers. In FIG. 2, just as in the subsequently explained FIG. 3, however, not the entire portion of fiber is recorded, but only the portion of long fibers; therefore that portion of the fibers was longer than 10 mm which, in the case of the fiber mixture used, was pertinent for about 90% of the fibers. At the measuring points in FIGS. 2 and 3 therefore, it has been stated in parentheses which total fiber portion in the case of the example corresponded to the portion of long fibers recorded each time. In the case of commercial fiber mixtures and fiber mixtures customary for such purpose, especially in the form of mineral fibers, the portion of short fibers under 10 mm and of impurities is considerably higher according to investigations on random samples made at random approximately between 30 and 90% dispersively, insofar as we are not dealing in any case with short fiber cuts which in this case were left out of consideration. In practice, the fiber mixture customarily is introduced as a charge into the mixture for the raw materials and thus it is intimately mixed with said raw materials. At the same time, fibers in a proportion of up to 8% by weight may be intermixed without causing problems, whenever about 40% of the fibers are shorter than 10 mm so that as a result in fact only about 5% of long fibers are added to the mixture. Whenever more than about 8 volume % of the fibers are to be admixed, then with such comparatively long fibers, agglomerates and lumps will be formed which make a homogeneous, thorough mixing more difficult. Higher fiber portions of 10 or even 12% therefore may only be admixed in the customary manner without causing problems, whenever the portion of the long fibers is lower so that in this case, too, long fibers in the order of magnitude of maximally about 5% by weight will be admixed.

For the production of a flexible ceramic according to the invention with a long fiber portion of about 10% by weight, it was necessary therefore to develop special mixing processes. In doing so, one first of all produces a premixture from the oxide aerogel and the other additive substances to which as the last component, the fibers are admixed gradually at least separated as groups, for example, in small, loose flakes, etc. In doing so, one should strive for the premixture to contain the oxide aerogel and the other additive substances, such as especially the opacifier in already such a homogeneous distribution as provided for the later flexible ceramic, so that concerning these other raw materials, there will be no need during the admixing of the fibers, for any additional homogenization. The last operating process of the gradual admixing of the fibers in a loose flake form or something similar, thus serves exclusively for its homogeneous distribution with the desired degree of homogenization.

As FIG. 2 illustrates, the bending strength in the case of a long fiber portion of 5%, as corresponds to the state of the prior art, in the case of lower bulk densities lies in the same order of magnitude as in the case of a very long fiber portion of 32.5%, which altogether may be inserted only with great difficulties and with the use of the previously described novel process, whereas in the case of a bulk density above 350 kg/m$^3$, the bending strength at a long fiber portion of 5% lies clearly above that in the case of a long fiber portion of 32.5%. Both limiting values however lie outside of the area dealt with in the invention of between 10 and 30% by weight of long fibers, which in the case of the explained special long staple fiber mixture of the experiments, which were carried out, corresponds to a total fiber portion between 11% and 33%. FIG. 2 however shows quite clearly that within the area according to the invention, between about 10 and 30% by weight of long fibers, the bending strength has a clear maximum between about 14 and about 20% by weight, especially between 15 and 18% by weight of long fibers. This maximum in its quality is independent of the pertinent bulk density, but in the case of lesser bulk densities, it is lower, whereby the curve also takes a flatter course. In the case of a bulk density below 200 kg/m$^3$, it turned out that the curve corresponding to FIG. 2 becomes so flat that no usable maximum can be determined anymore quantitatively, and a maximum of such a definition will only be achieved above 250 kg/m$^3$, which maximum as a rule justifies the increased expenditure for the production of such a mixture with a high long fiber portion. This tendency also continues beyond 380 or 400 kg/m$^3$ and one will achieve an ever more defined maximum, but at the expense of a low coefficient of thermal conductivity, as can be gathered from FIG. 1. In the case of a total fiber portion of 20% by weight which in the case of the selected long staple fiber mixture corresponds approximately to the maximum according to FIG. 2, there results for example in the case of a bulk density of 440 kg/m$^3$ as compared to a bulk density of 320 kg/m$^3$, a deterioration of the coefficient of thermal conductivity from about 0.0218 to 0.0263 W/mK, therefore of more than 20%, whereas in the case of the highest bulk density of 380 kg/m$^3$ according to FIG. 1, merely a deterioration to about 0.0231 will result, therefore of just 6%.

Such bending strengths, as illustrated in FIG. 2, may surely also be achieved by hardening according to the doctrine of the U.S. Pat. No. 3,055,831 and may be exceeded in case of need even in the case of lower bulk densities. According to Example IX of U.S. Pat. No. 3,055,831, in the case of a fiber portion of 5% by weight and a bulk density of 256 kg/m$^3$, there results a bending strength of 31 N/cm$^2$, in the case of Example X at a fiber portion of 12% by weight and a bulk density of 320 kg/m$^3$, there results a bending strength of 52 N/cm$^2$, and according to Example XI in the case of a fiber portion of 12% by weight and a bulk density of 320 kg/m$^3$, there results a bending strength of 32 N/cm$^2$, in the case of all three examples however, with a portion of 5% by weight of phenol resin as a hardening agent. The drop in the bending strength of Example X to Example XI of the U.S. Pat. No. 3,055,831 may be due to the fact that according to Example X, 67% by weight of silica aerogel is used, but in the case of the Example XI however only 55% by weight of silica aerogel is used, the rest always opacifier, the increased portion of opacifier leading to a decreased effectiveness of the hardened phenol resin with a decreased bending strength.

All these hardened flexible ceramics thus to be sure show considerable bending strengths but they are rigid and brittle. However, according to the invention, with a specially high portion of long fibers with a length of about 10 mm of about 10% by weight—in the case of heavier or lighter fiber materials than aluminum silicate fibers correspondingly more or less—one will achieve, however, that not only the bending strength rises clearly in the manner described and illustrated in FIG. 2, but beyond that surprisingly a good bendability or breaking strength will be achieved in the case of bending, as illustrated in FIG. 3.

Figure 3:
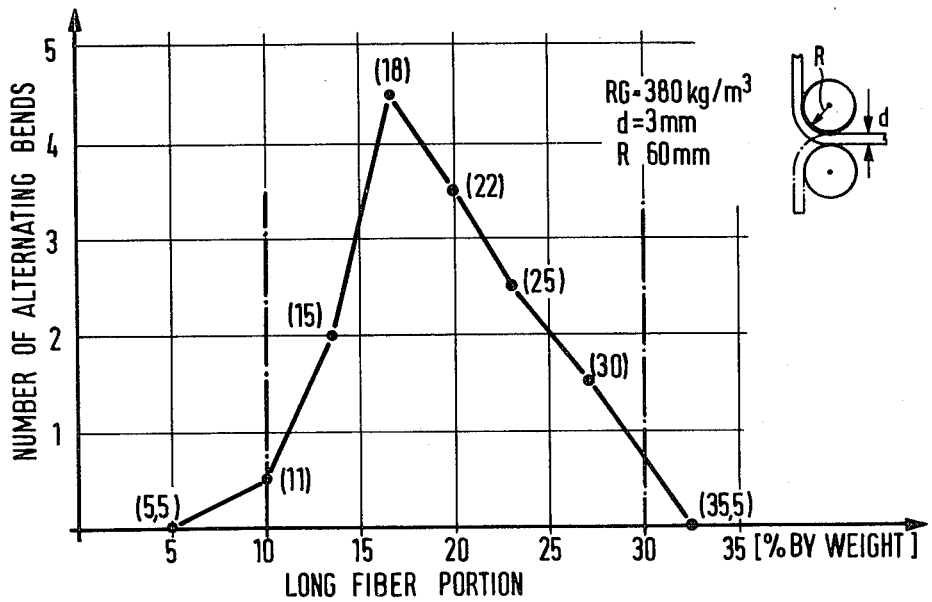
FIG. 3 shows a diagram of the dependence of the number of reversible bendings on the portion of long fibers.

In order to determine the values according to FIG. 3, a plate of 3 mm thickness and a bulk density of 350 kg/m$^3$ was produced in a flat form with the changing long fiber portion apparent from the measuring points in FIG. 3, which portion moreover corresponds to the long fiber portion at the measuring points in FIG. 2. This plate was bent back and forth around a cylindrical test body with a diameter of 120 mm, therefore with a bending radius of 60 mm, each side bending in opposite directions 90° over a peripheral section of the test body, as the diagram in FIG. 3 shows, the number of changes in bendings being maintained up to the breaking point.

As can be gathered in this respect from FIG. 3, only a flexible ceramic in the range according to the invention showed the capacity at all of being fitted in the direction of one side against the test body without breaking. In the case of a long fiber portion of 10% by weight, a bending in one direction only succeeded, whereas the plate broke already while being bent back. However, a maximum of 4½ changes of bending was apparent in practically exactly the same preferred range of the long fiber portion in which the maximum of bending strength also occurs. Here, the flexible ceramic therefore on the one hand has relative bending strength, and it therefore has a comparatively high momentum of resistance against bending and is dimensionally stable, but on the other hand nevertheless it may be bent surprisingly in both directions several times over a peripheral angle of 90° against the test body before a break occurs. Completely surprisingly however, the bending change number following this maximum also drops drastically against so that with an increased fiber portion of approximately 30%, not only the bending strength drops, but instead however, of the possible bending change number increasing, the bending change number also drops and is just as bad outside of the area according to the invention at the upper limit of the long fiber portion as in the lower limit.

The effective mechanism which constitutes the base of the phenomena described could not be conclusively clarified, but one must assume that comparatively speaking the erratic rise of the bending strength at a content of about 10% by weight of fibers of more than 10 mm of length is to be traced back to the fact that in the case of the then existing density of the long fibers, a certain mutual anchoring of the fibers occurs and at the same time the great length of fibers of each individual fiber of over 10 mm results in a good anchoring of the fiber in the aerogel. In the case of a maximal thickness of the fibers of about 10 µm, preferably below 5 µm, and especially in the area between 1 and 3 µm, this content of long fibers results in a correspondingly high number of fibers which as a result of the compression process, have a preferred alignment transversely to the direction of compression and thus cram the aerogel particles tightly together. At the same time, always macrospcopically large areas of flexible ceramic are kept on a multiplicity of individual fibers extending over this area so that even in the case of a bending around relatively small diameters, the range of the flexible ceramic lying on the outside of the neutral plane and under tensile stress are held by the fibers. Since the fibers, as compared to the aerogel particles, in any case are very great in the manner described introductorily, there results a very good adhesion of the aerogel particles to the fiber periphery and thus a corresponding holding effect even in the case of—microscopically viewed—moderate degrees of deformation.

In the case of a long fiber portion between about 14 and 20%, the most favorable conditions exist apparently insofar as a maximal portion of the aerogel particles find a direct or indirect hold on fiber areas located in the vicinity. The fibers which per se are limp as to bending or at least elastically bending, move along without problem in the case of every bending, whereas the aerogel particles between the fibers are supported by these on the one hand in such a way that the connecting substance formed thereby is also altogether relatively readily bendable, whereas vice versa the aerogel particles make the fibers so stiff and come into reciprocal action with them, that at the same time a high bending strength will result.

The drop of the bending strength and of the bending change number between about 20 and 30% by weight of long fiber portion allows the conclusion that the portion of fiber then becomes too high for this optimal alternating effect between fibers and aerogel particles. The drop of the bending strength probably results from the fact that then a relatively high volume portion of the flexible ceramic is assumed by limp or elastically bending fibers which are no longer supported or stiffened so well by the remaining aerogel possibly with inserted opacifier or something similar, whereby beyond a portion of long fibers of about 30% by weight, a substance with a fiber-matlike characteristic will start and the flexible ceramic altogether becomes limp as to bending. Surprisingly however, even such a matlike substance which is limp as to bending, is hardly also bendable without being indestructible; the reason for this may be found in the fact that the aerogel particles no longer find any sufficient adhesive conditions on the too high portion of fibers and are possibly squeezed in the case of the bending process between the fibers under tensile stress and crumble off, since there is no binder indeed for the aerogel particles, such as for example phenol resin.

Practically all fiber materials come into consideration for the formation of long fibers which materials are producible as elastically bendable or as limply bendable fibers of a sufficient fineness. Since however, the basic area of application of such flexible ceramics is the achievement of a highly effective thermal conductivity even at relatively high temperatures of 500° C. and more, in practice fibers are eliminated which do not have sufficient temperature stability always for the intended individual case. Therefore, in practice and within all rules, only inorganic fibers come into question. These may be mineral fibers, such as aluminum silicate fibers, aluminum oxide fibers, quartz fibers or mixtures thereof. However, metallic fibers may also be used, say for example, fibers of noble steels. In each case, the diameter of the fiber should not essentially exceed 3 $\mu$m and effectively should be at least below 5 $\mu$m, even in unfavorable cases in any case, it should be below 10 $\mu$m. For the long fibers, there results in the case of the preferred slight fiber diameters of, for example, 1 to 3 $\mu$m, a sufficient number of fibers on the one hand in the case of the stated portion of long fibers of the flexible ceramic and on the other hand a ratio of length of fiber to diameter of the fibers in the order of magnitude of several thousand, in the best instances over 10,000 which assists a mutual anchoring of the fibers in a fiber structure.

Preferably the oxide aerogel is silica aerogel but aluminum oxide aerogel, zirconium oxide aerogel or similar mixtures also may be used, aluminum oxide aerogel or an admixture of this aerogel with silica aerogel may be effective in order to achieve a higher temperature constancy.

As an opacifier, for which in the case of the samples examined silicon carbide was used, use may also be made of all other current opacifiers such as ilmenite, titanium dioxide etc., which have been known from the state of the prior art. Beside the opacifier, the flexible ceramic may contain additional additive substances, however no flexible ceramic curing binder.

The oxide aerogel should be present in the flexible ceramic with a minimum proportion of about 40%, since in the case of lower aerogel portions, no sufficient reciprocal action occurs any more between the aerogel and the long fibers for the achievement of the above described action mechanisms. The further additive substances, such as opacifiers, as far as has been examined hitherto, cannot take over the function of the aerogel in the case of the reciprocal action with the long fibers, but they act so to speak as functionless filler with regard to bending strength and bendability, in the case of higher contents of additive substances, they even act almost as separating agents, since the additive substances keep aerogel particles away from the fibers. Based on these considerations, a limitation for the permissible quantity of e.g. opacifier may result in the case of a high total fiber portion, since even the portion of short fibers and the impurities of the fiber mixture are to be considered similar to the opacifier as functionless additive substances. In the case of a portion of 20% of long fibers in the flexible ceramic and of only 50% in the fiber mixture, a total fiber portion of the plastic of 40% would thus result and an opacifier portion as well as the portion altogether of additional additive substances would have to be limited to 20% in order not to remain below the minimal portion of the oxide aerogel of 40%. Basically, however, one should strive to use a fiber mixture with the highest possible portion of long fibers of for example 90% so that in the case of a long fiber portion of for example 17%, an admixture of up to about 40% of additive substances is still permissible, whereby as a rule however, only a suitable opacifier in a proportion of about 20 to 30% is admixed, in favor of a higher portion of aerogel.

As experiments with variable fiber mixtures show, an optimum medium fiber length should lie at about 30 to 50 mm. Therefore, it would be ideal to prepare a fiber mixture with uniform fibers of a length of for example 40 mm.

However, in practice, fiber mixtures always have fibers of variable length so that this ideal length must be approximated by the selection of the fiber mixture with a frequency distribution deviating as little as possible. Too long fibers with lengths of for example above 70 mm obviously result in no additional gain in strength as compared to a fiber length of for example 30 to 50 mm more, but they will rather have a disadvantageous effect insofar as the number of fibers is decreased in the case of a given fiber portion resulting from the great fiber length. Moreover, in the case of extremely long fibers, increasingly significant problems of mixing will occur. On the other hand, in the manner already described, it turns out that fibers of a shorter length than about 10 mm are no longer capable of contributing essentially to the increase of the bending strength and the improvement of the bendability since such short fibers, viewed macroscopically, obviously do not extend beyond a sufficiently large area of the flexible ceramic in order to achieve the desired anchoring effect with adjoining fibers on the one hand and to the aerogel particles on the other hand. Therefore, it will be too easy to pull too short fibers from the surrounding flexible ceramic and in the case of tensile stress too short fibers will give at the outside of the bending as a result of relative movement of the flexible ceramic.

The good bending strength in conjunction with a good bendability opens up to the flexible ceramic according to the invention a great multiplicity of possibilities of application which hitherto had been closed to such flexible ceramics, since comparable bending strengths were achieved only with hardened, brittle flexible ceramic and comparable bendability was achieved, if at all, only with fiber portions of 50% and more with a simultaneous presence of a considerable quantity of especially organic binder, so that fiber mats with disadvantageously high coefficient of thermal conductivity and low bending strength resulted. Whenever hardened flexible ceramics of this type would be compared with respect to brittleness with simultaneous hardness, say with cast iron, then in the case of the flexible ceramic according to the invention, a comparability with the characteristics of steel would result, whereas fiber mats treated with binder would be comparable say with the working material lead. At the same time, the thermal insulating capacity of a flexible ceramic according to the invention is at least as good as that of a hardened flexible ceramic with a low fiber portion of for example 5%, since the addition of binder in the case of the hardened flexible ceramic produces at least an equally great rise of the coefficient of thermal conductivity as the increased fiber portion of the flexible ceramic according to the invention; as compared to fiber mats with extremely high fiber portion and a binder addition, the coefficient of thermal conductivity of the flexible ceramic according to the invention is considerably better, since the fiber portion is clearly less and moreover binder is missing.

The flexible ceramic according to the invention may be compressed in the form of foils with thicknesses between for example 0.5 mm and 3 to 5 mm, and in this form it has similar characteristics such as e.g. asbestos paper or asbestos cardboard which, especially impregnated with bitumen, have found widespread use as roofing material. Even thin films, with a thickness of 0.5 to 1 mm have, in view of the relatively high bendability, still a stability of shape which at the same time facilitates their handling and capability of being processed. Nevertheless, such films are very well bendable and therefore may be adapted readily even to considerably curved surfaces, whenever they are laid. In FIG. 4, such a film 5 has been illustrated with a thickness d of for example 1 mm which in its middle area has a stamped in indentation 6.

According to FIG. 5, a foil of the type for example illustrated in FIG. 4 has been glued in the manner of a sandwich as an insulating layer 7 between metal sheets 8 and 9, made for example of aluminum. In the case of the attachment of a corresponding, e.g. deep drawn indentation on the metal sheets 8 and 9, it will also be possible to insert directly also a foil 5 with the indentation 6 of the type seen in FIG. 4, as an insulating layer 7, whereby the compound thermal insulating element according to FIG. 5 would then altogether have a corresponding indentation 6. The sandwichlike construction of the thermal insulating element according to FIG. 5 is fully recognizable from the section which is enlarged there, in which the adhesive layers 10 and 11 are also illustrated at both sides of the insulating layer 7 for their attachment to the middle sheets 8 and 9. Instead of the comparatively thick metal sheets 8 and 9, it will also be possible to attach correspondingly thinner metal foils on one or both sides of the insulating layer 7. In each case, the foils or the metal sheets 8 and 9 combined with the layers 10 and 11 of the adhesive impart an additional hold to the surfaces of the insulating layer 7 so that the moldability of such a sandwich thermal insulating element may even be considerably improved further as compared to that of a blank foil 5 according to FIG. 4.

According to FIG. 6, a comparatively thick insulating layer 12 made of the flexible ceramic according to the invention has been attached to a relatively strong supporting metal sheet 14 by means of a layer 13 of an adhesive. Such a compound body may be molded especially in the direction of the arrows 15 according to FIG. 6, therefore in such a way that the supporting metal sheet 14 lies on the bending-outside, may be molded well say for the formation of a pipe with an inside lining formed by the insulating layer 12, since in that case, the insulating layer 12 made of the flexible ceramic according to the invention is preferably applied in pressure and is stabilized by the adhesive layer 13 with its outside still under tensile stress. The free side of the insulating layer 12 may be covered up additionally by a sheet 16 which however is not attached to the insulating layer 12 but may slide on its topside. For this purpose, the sheet 16 is connected with the metal sheet 14 at only one edge 17 in a suitable manner in the case of this example by rivets 18. The sheet 16 may serve say in the case of the formation of a pipe from the compound body according to FIG. 6 as an inside cover up layer for the insulating layer 12.

Instead of a one sided attachment to one edge 17, in the case of an embodiment according to FIG. 7, it may also be possible to secure a relative movability of a corresponding cover up layer 19 with simultaneous securing of the position on the compound body through the fact that the web 19 is held vis-a-vis a holding supporting metal sheet 20 at both edges 21 and 22 of the compound element in a shiftable manner. Because of the lack of an adhesive layer, the web 19 is also movable in a sliding manner in relation to the insulating layer 24 fixed on the metal sheet 20 by means of an adhesive layer 23. At the edges 21 and 22, the supporting metal sheet 20 reaches beyond the insulating layer 24 and the web 19 with the holding strip 25 bent back, which covers up the outside surface of the web 19 and holds it in such a way, whereas in the illustrated manner, a lateral relative movement of the web 19 is possible between the edges 21 and 22. Possibly the web 19 may be fixed by means of an adhesive area 26 disposed approximately in the middle and indicated in FIG. 7 by a dash dot line and may be fixed as compared to the insulating layer 24 in a line parallel to the bending axis while the lateral edges of the web 19 are relatively movable in the area of the edges 21 and 22 of the compound element in the case of a bending according to the arrows 27 drawn in FIG. 7. The compound element according to FIG. 7 may also be bent into the shape of a pipe for example in the direction of the arrows 27. However, there also exists the possibility of a bending according to the arrow 28 around a bending axis lying transversely or perpendicularly to the edges 21 and 22, possibly likewise into the shape of a pipe, whereby then the edges 21 and 22 would come to lie not in the same area of the pipe but at the front sides of the pipe; in such a case, the longitudinal extent of a possible adhesive area 26 would have to lie transversely in relation to the illustration drawn, therefore again essentially in parallel to the new bending axis.

In FIG. 8, a thermal insulating element is illustrated which consists of a supporting metal sheet 29 of a thickness of, for example, 0.5 mm, an insulating layer 30 of a thickness of, for example, 2 mm and of an adhesive layer 31 disposed in between, whereby the free surface of the insulating layer 30 is covered up by a thin foil 32, for example, made of aluminum, which is attached to the insulating layer 30 by way of an adhesive layer 33. This construction becomes clear from the sectional presentation shown at an enlarged scale. As FIG. 8 illustrates, the metal sheet 29 with the insulating layer 30 glued to it and laminated with the foil 32 may be bent by 180° in order to obtain a beaded edge 34 without destroying the mechanical integrity of the flexible ceramic of the damping layer 30.

It is obvious that foils of the type apparent from FIG. 4 and laminated thermal insulating elements of the type apparent from the FIGS. 5 to 8 have practical possibilities for their use. The flexible ceramic according to the invention has an overwhelming thermal insulating capacity even in the case of higher temperatures and even in the case of very low insulating thicknesses which capacity could be achieved by other thermal insulating materials only in the case of a much greater insulating thickness. The capacity of such a flexible ceramic of forming a highly effective thermal insulation in the tightest space becomes fully effective as a result of the bending strength achieved according to the invention in conjunction with the bendability, since precisely the bendability makes it possible to make a flexible ceramic available in the form of a foil or of a laminated thermal insulating element always with the desired shape and to make it sufficiently resistant against shocks etc. As a result of that, a multiplicity of new possibilities of use, especially in the demanding technological fields, is opened up, such as for example, power tool, airplane, rocket or satellite construction. However, also in less demanding technological areas, problems frequently arise which under unfavorable conditions of insertion, require a highly effective thermal insulation with the least possible insulating thickness and which may be solved with the flexible ceramic according to the invention, for example, within the scope of the construction of an exhaust gas muffler or in comparable individual cases. The adhesive for the adhesive layers 10, 11, 13, 23, 31 or 33 may at the same time be selected in accordance with the heat load of the thermal insulating element that is to be expected, whereby a sufficient temperature constance of the adhesive may be achieved in every case by the use of an inorganic adhesive, for example, on the basis of aluminum silicate or water glass.

What is claimed is:

1. Thermal insulating flexible ceramic on the basis of microporous oxide aerogel obtained from flame hydrolysis with elastically bending or limply bending, fibers with or without additional additive substances characterized by the combination of the following features:
    (a) the frequency distribution of the length of fibers has a maximum of over 10 mm;
    (b) the flexible ceramic is compressed up to a bulk density of more than 200 kg/m$^3$;
    (c) the sum of the portions of weight of the fibers and of the additive substances, which however contain no binder, lies between about 10% and 60% of the flexible ceramic; and
    (d) the portion of weight of fibers with a specific density of the fiber material of 2.55 g/cm$^3$ insofar as the fibers have a greater length than 10 mm, lies between about 10% and 30% of the flexible ceramic, whereby in the case of fiber material with a density of 2.55 g/cm$^3$, the portions deviating from weight are to be changed with a factor which corresponds to the ratio of the deviating density to 2.55.

2. Flexible ceramic as in claim 1, characterized in that the portion of weight of the fibers with a greater length than 10 mm lies between about 12 and 25%.

3. Flexible ceramic as in claim 2, characterized in that the portion of weight of the fiber with a greater length than 10 mm lies between 12 and 20%.

4. Flexible ceramic as in claim 1, characterized in that the thickness of the fibers lies below 10 μm.

5. Flexible ceramic as in claim 1, characterized in that the frequency distribution of the fiber length has a maximum between 20 mm and 70 mm.

6. Flexible ceramic as in claim 1, characterized in that the bulk density of the plastic lies between 300 kg/m$^3$ and 400 kg/m$^3$.

7. Flexible ceramic as in claim 1, characterized in that the inorganic fibers are mineral fibers.

8. Flexible ceramic as in claim 1, characterized in that the inorganic fibers are metallic fibers.

9. Flexible ceramic as in claim 1, characterized in that the oxide aerogel is a silica aerogel, zerconium oxide or an aluminum oxide aerogel, zerconium oxide or a mixture thereof.

10. Process for the production of a flexible ceramic as in claim 1 comprising mixing and pressing the components with the fibers being admixed at the last components at least separated as groups.

11. Process as in claim 10 wherein there is used an additive substance and first of all there is produced a premixture of aerogel and additive substance in which the additive substance is present a homogeneous distribution corresponding at least approximately to the distribution in the flexible ceramic.

12. Thermal insulating, pliable foil with a thickness up to below 1 mm made of a flexible ceramic according to claim 1.

13. Thermal insulating flexible ceramic according to claim 1, wherein there is present an opacifier.

14. Thermal insulating flexible ceramic according to claim 1, wherein the fibers are inorganic fibers.

15. Thermal insulating flexible ceramic according to claim 14 wherein there is present an opacifier.

16. Thermal insulating flexible ceramic according to claim 15 wherein the plastic is compressed to a bulk density of over 250 kg/m$^3$.

17. Thermal insulating flexible ceramic according to claim 15 wherein the portion of weight of the fibers with a greater length than 10 mm lies between about 12 and 25%.

18. Thermal insulating flexible ceramic according to claim 17 wherein the portion of weight of the fibers with a greater length than 10 mm lies between 12 and 22%.

19. Thermal insulating flexible ceramic according to claim 1 wherein the portion of weight of the fibers with a greater length than 10 mm lies between 12 and 22%.

20. Thermal insulating flexible ceramic according to claim 17 wherein the portion of weight of the fibers with a greater length than 10 mm lies between 12 and 20%.

21. Thermal insulating flexible ceramic according to claim 17 wherein the portion of weight of the fibers with a greater length than 10 mm lies between 14 and 20%.

22. Thermal insulating flexible ceramic according to claim 17 wherein the portion of weight of the fibers with a greater length than 10 mm lies between 15 and 18%.

23. Thermal insulating flexible ceramic according to claim 15 wherein the thickness of the fibers lies below 10 μm.

24. Thermal insulating flexible ceramic according to claim 23 wherein the portion of weight of the fibers with a greater length than 10 mm lies between about 12 and 25%.

25. Thermal insulating flexible ceramic according to claim 24 wherein the thickness of the fibers lies below 5 μm.

26. Thermal insulating flexible ceramic according to claim 25 wherein the thickness of the fibers is at 1 to 3 μm.

27. Thermal insulating flexible ceramic according to claim 4 wherein the thickness of the fibers lies below 5 μm.

28. Thermal insulating flexible ceramic according to claim 27 wherein the thickness of the fibers is at 1 to 3 μm.

29. Thermal insulating flexible ceramic according to claim 15 wherein the frequency distribution of the fiber length has a maximum between 20 mm and 70 mm.

30. Thermal insulating flexible ceramic according to claim 29 wherein the frequency distribution of the fiber length has a maximum between 30 and 50 mm.

31. Thermal insulating flexible ceramic according to claim 1 wherein the frequency distribution of the fiber length has a maximum between 30 and 50 mm.

32. Thermal insulating flexible ceramic according to claim 17 wherein the frequency distribution of the fiber length has a maximum between 30 and 50 mm.

33. Thermal insulating flexible ceramic according to claim 32 wherein the portion of the fibers with a greater length than 10 mm lies between about 12 and 25%.

34. Thermal insulating flexible ceramic according to claim 33 wherein the thickness of the fibers lies below 10 μm.

35. Thermal insulating flexible ceramic according to claim 34 wherein the thickness of the fibers is at 1 to 3 μm.

36. Thermal insulating flexible ceramic according to claim 15 wherein the bulk density of the plastic lies between 300 kg/m³ and 400 kg/m³.

37. Thermal insulating flexible ceramic according to claim 36 wherein the bulk density of the plastic is about 350 kg/m³.

38. Thermal insulating flexible ceramic according to claim 1 wherein the bulk density of the plastic is about 350 kg/m³.

39. Thermal insulating flexible ceramic according to claim 17 wherein the bulk density of the plastic lies between 300 kg/m³ and 400 kg/m³.

40. Thermal insulating flexible ceramic according to claim 39 wherein the thickness of the fibers lies below 10 μm.

41. Thermal insulating flexible ceramic according to claim 40 wherein the thickness of the fibers is at 1 to 3 μm.

42. Thermal insulating flexible ceramic according to claim 41 wherein the frequency distribution of the fiber length has a maximum between 30 and 50 mm.

43. Thermal insulating flexible ceramic according to claim 15 wherein the inorganic fibers are aluminum silicate fibers, aluminum oxide fibers, quartz fibers or metal fibers.

44. Thermal insulating flexible ceramic according to claim 5 wherein the inorganic fibers are aluminum silicate fibers, aluminum oxide fibers or quartz fibers.

45. Thermal insulating flexible ceramic according to claim 44 wherein the bulk density of the plastic lies between 300 kg/m³ and 400 kg/m³.

46. Thermal insulating flexible ceramic according to claim 45 wherein the portion of weight of the fibers with a greater length than 10 mm lies between about 12 and 25%.

47. Thermal insulating flexible ceramic according to claim 46 wherein the thickness of the fibers lies below 10 μm.

48. Thermal insulating flexible ceramic according to claim 47 wherein the thickness of the fibers is at 1 to 3 μm.

49. Thermal insulating flexible ceramic according to claim 48 wherein the frequency distribution of the fiber length has a maximum between 30 and 50 mm.

50. Thermal insulating flexible ceramic according to claim 43 wherein the inorganic fibers are metal fibers.

51. Thermal insulating flexible ceramic according to claim 50 wherein the metal fibers are noble steel fibers.

52. Thermal insulating flexible ceramic according to claim 51 wherein the portion of weight of the fibers with a greater length than 10 mm lies between about 12 and 25%, the thickness of the fibers lies below 10 μm and the frequency distribution of the fiber length has a maximum between 30 and 50 mm.

53. Thermal insulating flexible ceramic according to claim 9 wherein the aerogel is a silica aerogel, an aluminum oxide aerogel or a mixture thereof.

54. Thermal insulating flexible ceramic according to claim 6 wherein the inorganic fibers are aluminum silicate fibers, aluminum oxide fibers or quartz fibers.

55. Thermal insulating flexible ceramic according to claim 54 wherein the bulk density of the plastic lies between 300 kg/m³ and 400 kg/m³.

56. Thermal insulating flexible ceramic according to claim 55 wherein the portion of weight of the fibers with a greater length than 10 mm lies between about 12 and 25%.

57. Thermal insulating flexible ceramic according to claim 56 wherein the thickness of the fibers lies below 10 μm.

58. Thermal insulating flexible ceramic according to claim 57 wherein the thickness of the fibers is at 1 to 3 μm.

59. Thermal insulating flexible ceramic according to claim 58 wherein the frequency distribution of the fiber length has a maximum between 30 and 50 mm.

60. Thermal insulating flexible ceramic according to claim 53 wherein the inorganic fibers are metal fibers.

61. Thermal insulating flexible ceramic according to claim 60 wherein the portion of weight of the fibers with a greater length than 10 mm lies between about 12 and 25%, the thickness of the fibers lies below 10 μm and the frequency distribution of the fiber length has a maximum between 30 and 50 mm.

62. Thermal insulating flexible ceramic according to claim 54 wherein the portion of weight of the fibers with a greater length than 10 mm lies between about 12 and 25%, the thickness of the fibers lies below 10 μm and the frequency distribution of the fiber length has a maximum between 30 and 50 mm.

63. Thermal insulating flexible ceramic according to claim 62 wherein the inorganic fibers are aluminum silicate fibers, the aerogel is a silica aerogel and the opacificer is silicon carbide.

64. Thermal insulating flexible ceramic according to claim 53 wherein the aerogel is a silica aerogel.

65. Thermal insulating flexible ceramic according to claim 15 wherein the opacifier is silicon carbide, titanium dioxide or ilmenite.

66. Process according to claim 10 wherein the fibers are inorganic fibers and there is present an opacifier.

67. Thermal insulating, pliable foil with a thickness up to below 1 mm made of a flexible ceramic according to claim 15.

68. Thermal insulating, pliable foil with a thickness up to below 1 mm made of a flexible ceramic according to claim 2.

69. Thermal insulating, pliable foil with a thickness up to below 1 mm made of a flexible ceramic according to claim 3.

70. Thermal insulating, pliable foil with a thickness up to below 1 mm made of a flexible ceramic according to claim 4.

71. Thermal insulating, pliable foil with a thickness up to below 1 mm made of a flexible ceramic according to claim 5.

72. Thermal insulating, pliable foil with a thickness up to below 1 mm made of a flexible ceramic according to claim 6.

73. Thermal insulating, pliable foil with a thickness up to below 1 mm made of a flexible ceramic according to claim 7.

74. Thermal insulating, pliable foil with a thickness up to below 1 mm made of a flexible ceramic according to claim 8.

75. Thermal insulating, pliable foil with a thickness up to below 1 mm made of a flexible ceramic according to claim 9.

* * * * *